Aug. 10, 1965   J. E. WALDRUM   3,199,786
NOZZLE FOR LIQUID SPRAYING DEVICE
Filed Dec. 17, 1963   2 Sheets-Sheet 1
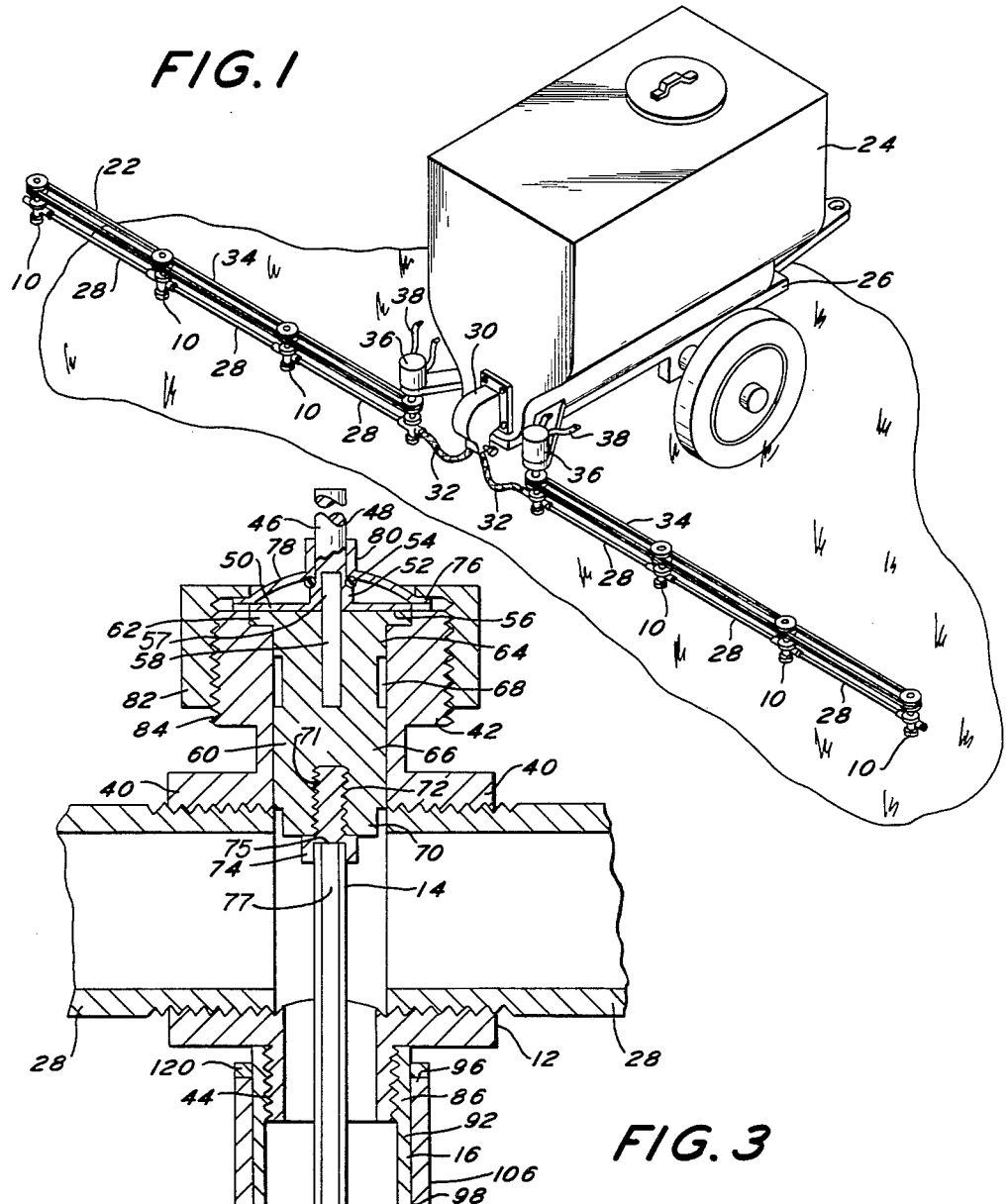
INVENTOR.
JOHN E. WALDRUM
BY
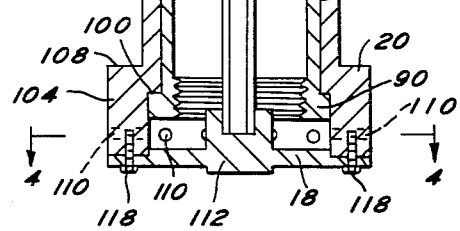
ATTORNEYS.

Aug. 10, 1965   J. E. WALDRUM   3,199,786
NOZZLE FOR LIQUID SPRAYING DEVICE
Filed Dec. 17, 1963   2 Sheets-Sheet 2
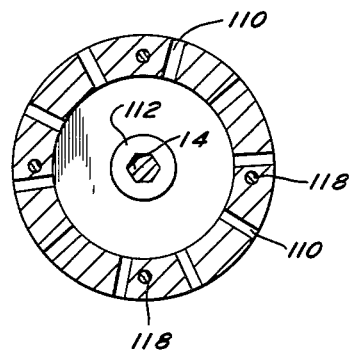
FIG. 4
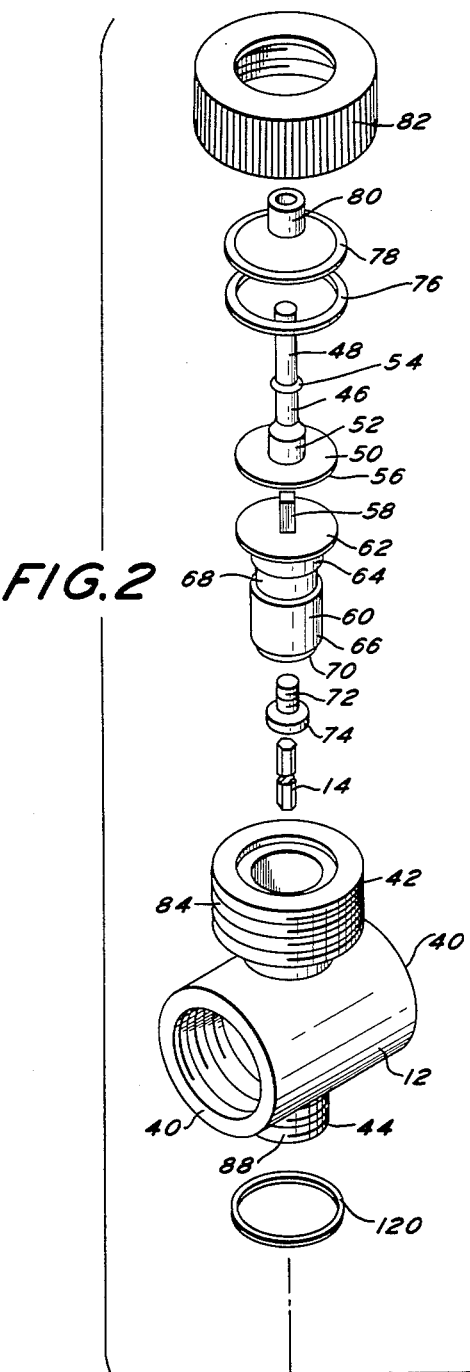
FIG. 2
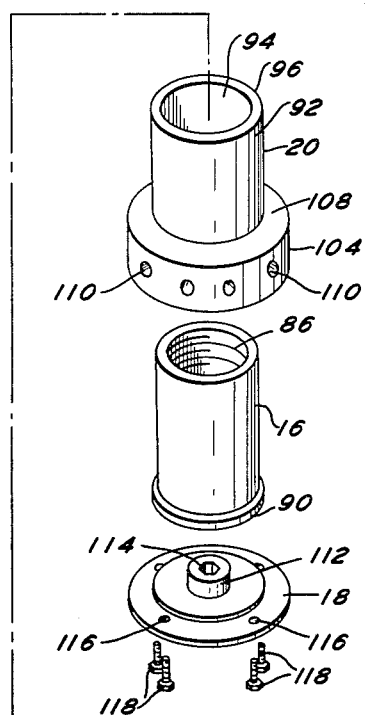
INVENTOR.
JOHN E. WALDRUM
BY
Caesar and Rivise
ATTORNEYS.

United States Patent Office 3,199,786
Patented Aug. 10, 1965

3,199,786
NOZZLE FOR LIQUID SPRAYING DEVICE
John E. Waldrum, Ambler, Pa., assignor to Amchem Products, Inc., Ambler, Pa., a corporation of Delaware
Filed Dec. 17, 1963, Ser. No. 331,185
1 Claim. (Cl. 239—223)

This invention relates to a nozzle for liquid spraying device and has as its objective the provision of a new and improved device of this general class.

The invention has particular application to a spray device for applying agricultural chemicals to a field and particularly relates to a spray device for use with relatively heavy, viscous liquids.

It is known to apply agricultural chemicals, such as herbicides, in the field by mechanisms generally known as mist applicators or cyclone applicators. Essentially such mechanisms include a fan, usually enclosed in a shroud, and an orifice for introducing the liquid to be sprayed into the air blast created by the fan. The fan is of a high velocity type, often generating blasts of air of 90 miles an hour or more.

The orifice for injecting the liquid to be sprayed into the air blast was heretofore usually either provided in the hub of the fan or a plurality of orifices was provided on the shroud in a position to inject the liquid into the air blast in the form of a stream.

The above-mentioned systems were usually quite satisfactory for water-thin liquids; however, when relatively thick, viscous liquids were used, and particularly when such liquids had a tendency to work-harden, a considerable pumping force was necessary to get the liquids into the blast of air. In those cases where considerable thickening and hardening took place, such modes of application were found to be practically useless.

In order to overcome the foregoing problems, liquid spray devices of a different character were introduced. These are exemplified by Waldrum Patents No. 2,917,242 and No. 2,965,302. In Patent No. 2,917,242 the thick, viscous liquid was fed to a spinning recessed plate from which the liquid was discharged by centrifugal force through spray heads. In Patent No. 2,965,302 the thick, viscous liquid was discharged from rotating nozzles into an air stream with laterally projecting blades adjacent the nozzles being positioned in the downstream path of airflow.

The foregoing devices have proved to be quite satisfactory. However, under certain applications it has been deemed desirable to apply the thick, viscous liquid as a stream of relatively uniform droplets with the ability to hove some control with respect to the size and amplitude of the droplets.

Accordingly, a device was provided to meet the aforesaid problems in prior co-pending application Serial No. 303,906, filed August 22, 1963, with the inventor being John E. Waldrum. The liquid spraying device of said prior filed application basically comprised an inner stator, a rotor generally telescoped about the stator, and a fixed rotor cover telescoped about the rotor. A fixed stator support or inlet tube was provided which permitted liquid under pressure to enter the stator. The stator of the prior device had a plurality of teeth defining passageways between them in order to permit the liquid under pressure to depart from the stator by moving outwardly therefrom through the passageway. In so doing, the liquid was chopped into segments.

The outwardly moving liquid was immediately forced to enter a compartment of the rotor which, in a first embodiment of the invention, was caused to revolve about its own axis by means of a driving belt. The liquid in the compartments of the rotor accordingly had a centrifugal force imposed thereon by virtue of the rotation of the rotor.

The liquid in the compartments of the rotor was forced outwardly from the rotor by virtue of the pressure of other incoming liquid and also because of the centrifugal force imposed thereon. The liquid leaving outwardly from the rotor then emerged from the liquid spray device by passing through small openings provided in the fixed rotor cover which was telescoped about the rotor. Furthermore, an end cover was secured for rotation with the rotor in order to force the liquid to pass through the aforesaid stator teeth, rotor compartments and openings in the rotor cover.

However, for certain applications it is desirable to spray a heavy, viscous liquid without having to perform substantial work thereon. It is also desirable to be able to secure such a spraying device to a conventional tractor boom.

It is accordingly an object of the present invention to provide a nozzle for a liquid spraying device which achieves spraying of a heavy, viscous liquid without the necessity of performing substantial work thereon.

Yet another object of the present invention is to provide a nozzle for a liquid spraying device which can be associated with a conventional tractor boom.

Still another object of the present invention is to provide a nozzle for liquid spraying wherein the liquid will depart or be sprayed in the form of a stream of droplets in a desired manner.

Other objects and many of the attendant advantages of the present invention will be readily appreciated as the same becomes better understood by reference to the following detailed description when considered in connection with the accompanying drawings wherein:

FIG. 1 is a perspective view of several devices embodying the present invention being secured to a conventional tractor boom;

FIG. 2 is an enlarged perspective exploded view of one of the devices of FIG. 1;

FIG. 3 is an enlarged sectional view of the fully assembled device of FIG. 2; and FIG. 4 is a sectional view taken along the lines 4—4 of FIG. 3.

Referring now to the various figures of the drawing wherein like reference characters refer to like parts, there is shown in FIG. 1 a nozzle for liquid spraying device embodying the present invention. The various elements comprising the device 10 are shown in detail in the exploded view of FIG. 2.

Thus, the present device 10 comprises a liquid feed adapter 12, a drive shaft 14 extending through the adapter 12 and stator 16, the shaft 14 being secured in the socket of a rotor cap 18 to which the rotor 20 is secured. Hence, rotation of the shaft 14 is conveyed to the rotor cap 18 which in turn causes rotation of the rotor 20.

As shown in FIG. 1, the present device and several like like it may be associated with a tractor boom 22 that is mounted on a tank spray 24 that is positioned on carriage 26.

Each of the devices 10 are connected together in a manifold-type arrangement by means of short lengths of tubing 28 through which the material to be sprayed passes. The liquid to be sprayed is contained in the sprayer 24 and is conveyed to the devices 10 by means of pump 30 forcing the same through flexible hose 32 and then into the lengths of tubing 28. The drive shaft 14 of each of the devices 10 is rotated by means of belts 34 that are driven by hydraulic motors 36 having hydraulic lines 38 associated therewith. Of course, other drive means, such as a spindle or cable type drive mechanism as shown in FIG. 3, may be utilized, as will be apparent to those skilled in the art.

The various elements comprising the device 10 are illustrated in detail in FIGS. 2 and 3.

The liquid feed adapter 12 includes horizontal arms 40 with appropriate threads in order to receive the lengths of tubing 28 in the manifold arrangement. The liquid feed adapter 12 further includes upper vertical arm 42 and lower arm 44. The upper vertical arm 42 receives the drive shaft 14 and certain of the various elements associated therewith, and the lower vertical arm 44 is associated with the rotor and the various elements in connection therewith.

As illustrated in FIG. 3, the drive shaft 14 extends from a point within the adapter 12, downwardly beyond the adapter 12 for a considerable distance. As illustrated in FIG. 4, the drive shaft 14 is of a hexagonal cross-section.

Attention is further called to FIG. 3 which shows that the drive shaft 14 is driven by a drive spindle 46. In the embodiment of FIG. 3 a spindle or cable drive mechanism is associated with the drive spindle 46. As shown in FIG. 2, the drive spindle 46 basically comprises a rod 48 and a plate 50. The rod 48 merges into the plate 50 through the boss 52 which has an integral sealing ring 54 slidably positioned thereon. The undersurface 56 of the plate 50 has a square opening 57 formed therein which receives pin 58 of the square cross-section that projects upwardly from drive coupling 60 in order that the rotation of the drive spindle 46 may be transferred to the drive coupling 60.

As shown in FIG. 2, the drive coupling 60 includes an upper flat end 62 from which the pin 58 extends. The coupling 60 further includes a narrow upper collar 64 and a wide lower collar 66 which are separated by restricted section 68. A short flange 70 depends from the collar 66 and has an internally threaded bore 71 which receives the threaded stem of a drive link 72 that is in the nature of a bolt. The head 74 of the link 72 possesses a hexagonal opening 75 in order that the top end 77 of drive shaft 14 may be coupled with drive link 72.

It is to be noted that a sealing ring 76 with an inner diameter slightly greater than the plate 50 and equal to the diameter of spindle cover 78 is seated about the plate 50 and receives the spindle cover 78 having an annular collar 80 through which the drive spindle 46 extends. Finally, the upper assembly of the device 10 is completed by the provision of an adapter cover 82 with an enlarged top opening and internal side threads that mate with the external threads 84 of the upper vertical arm 42.

It is thus seen that rotation of the drive spindle 46 is conveyed through the pin 58 to the drive coupling 60 which is in turn operatively connected through drive link 72 to drive shaft 14.

As previously discussed, the rotation of the drive shaft 14 is conveyed to the rotor cap 18 which in turn causes rotation of the rotor 20. The aforesaid elements are associated with the liquid feed adapter 12 through the stator 16 which includes an internally threaded bore 86 that mates with the external threads 88 of the lower vertical arm 44. In this connection it is to be noted that the sator 16 is fixed and does not rotate whereas the rotor 20 is telescoped on the stator 16 and revolves thereabout, with respect thereto.

It is to be further noted that the stator 16 includes adjacent its lower end a flange 90 which serves as a bearing to support the rotor 20. As shown in FIG. 2 the rotor 20 includes a section 92 having an open upper end 94 as defined by wall 96.

As best shown in FIG. 3, the wall 96 of the rotor 20 depends downwardly with the inner surface 98 thereof then extending outwardly in a step 100 from which an inner wall 102 of spray section 104 extends.

The outer surface 106 of the wall 96 generally parallels the inner surface 98 but then moves outwardly in a broad flange 108 adjacent the step 100 from which the spray section 104 depends.

It should, therefore, be seen that the step 100 is telescoped about or is supported for rotation on the flange 90 of the stator 16. Where desired a suitable bearing may be associated with the step 100 in view of the relative rotation between the rotor 20 and the stator 16. Of further interest is the fact that the spray section 104 of the rotor 20 extends beyond the edge of the flange 90 (as demonstrated by FIG. 4 which is a sectional view taken below flange 90, looking in a downward direction) in order that the material being sprayed may emerge from the stator 16 and pass through the rotating opening 110 in the spray section 104.

As shown in FIG. 2, the rotor cap 18 includes a socket 112 having a hexagonal opening 114 in order to receive the lower end of the drive shaft 14. The rotor cap 18 possesses openings 116 in order to permit the bolts 118 to be secured in appropriate openings in the end wall of the spray section 104 of the rotor 20. A thrust washer 120 adjacent the inner end of rotor 20 is also provided.

In operation several devices 10 may be associated with a tractor boom as shown in FIG. 1 or operated by a spindle or cable type drive mechanism as illustrated in FIG. 3. In either event the drive spindle 46 is caused to rotate by the drive mechanism. This in turn causes rotation of the drive coupling 60 by virtue of its being secured to the drive spindle 46 through interfitting of the pin 58 of the coupling 60 in a complementary opening in the undersurface 56 of the plate 50 of the drive spindle 46. Rotation of the drive coupling 60 is thereby conveyed to the drive shaft 14 through the drive link 72. Rotation of the drive shaft 14 is in turn conveyed to rotor cap 18 by virtue of the drive shaft 14 being coupled to the rotor cap 18 through the socket 112. Since the rotor 20 is secured to the rotor cap 18, the rotor 20 rotates whenever the rotor cap 18 is rotated by the drive shaft 14.

Thus, liquid pumped to the device 10 through the lengths of tubing 18 passes downwardly through the lower vertical arm 44 of the adapter 12, through the stator 16 and then through the rotating opening 110 of the spray section 104 of the rotating rotor 20. Because of the centrifugal force of rotation of the rotor 20, the liquid is sprayed in a circular area, and emerges from the opening 110 in a steady arcuate pattern, but without substantial work having been performed thereon. In this manner, adequate coverage of the heavy, viscous herbicide is achieved.

Obviously, many modifications and variations of the present invention are possible in the light of the above teachings. It is, therefore, to be understood that within the scope of the appended claim, the invention may be practiced otherwise than as specifically described.

What is claimed as the invention is:

A liquid spraying device comprising a fixed inner stator, means to supply liquid under pressure to said stator, a movable rotor having a spray section with spray openings, said rotor being generally telescoped about said stator with said spray section being positioned beyond said stator, a rotor cap including a socket secured to and adapted to drive said rotor, and drive shaft means extending through said stator and being secured within said rotor cap socket, said drive shaft means being driven by an assembly including a drive spindle and a drive coupling, a source of power associated with said drive spindle, said drive spindle including an undersurface having an opening adapted to receive a pin projecting from said drive coupling, said drive coupling also including a flange at an end opposite of said pin, said flange having an internally threaded bore adapted to receive the stem of a drive link having a head with an opening adapted to receive the internal end of said drive shaft means, whereby rotation of said drive spindle in conveyed through said pin to said drive coupling and then further conveyed through said drive link to said drive shaft means, whereby rotation of said drive shaft is conveyed via said rotor cap to said rotor with the liquid passing through the moving openings of said spray section with the avoidance of the performance of substantial work thereon.

References Cited by the Examiner

UNITED STATES PATENTS

| | | | |
|---|---|---|---|
| 2,047,699 | 7/36 | MacLachlan | 239—223 |
| 2,587,083 | 2/52 | Andermatt | 239—223 |
| 3,026,046 | 3/62 | Wickham | 239—223 |
| 3,029,027 | 4/62 | Gray | 239—222 |
| 3,044,441 | 7/62 | Blakeslee | 239—223 |
| 3,127,109 | 3/64 | Frase | 239—162 |

FOREIGN PATENTS 141,689  1/50  Australia.

OTHER REFERENCES

German printed application, G 15,659, December 1956.

M. HENSON WOOD, JR., *Primary Examiner.*

EVERETT W. KIRBY, *Examiner.*